F. L. MORSE.
VALVE MECHANISM FOR GAS ENGINES.
APPLICATION FILED MAY 11, 1915.
1,210,672.
Patented Jan. 2, 1917.
4 SHEETS—SHEET 2.
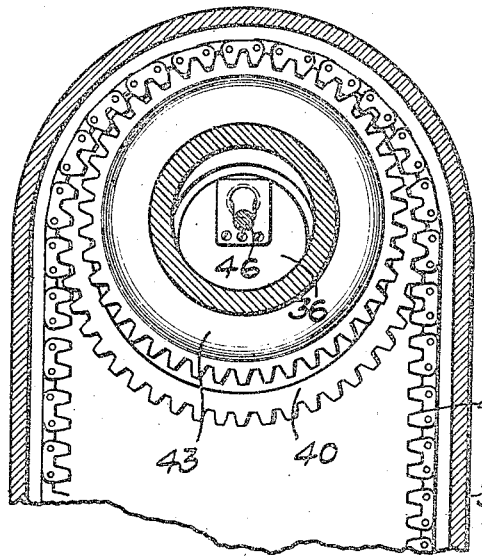
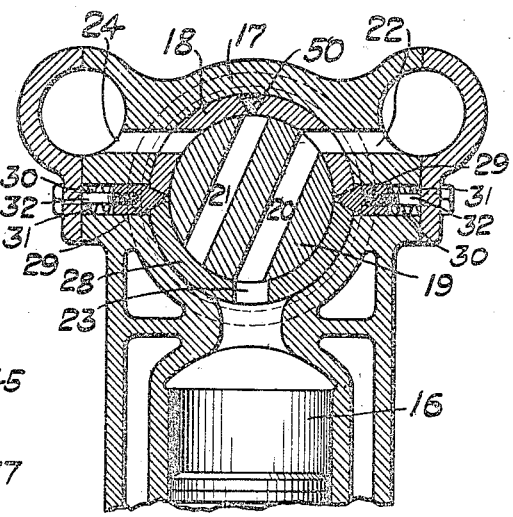
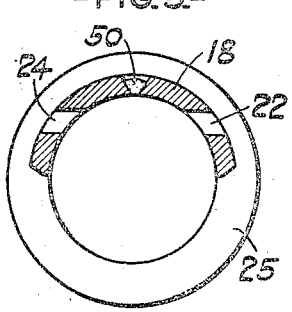
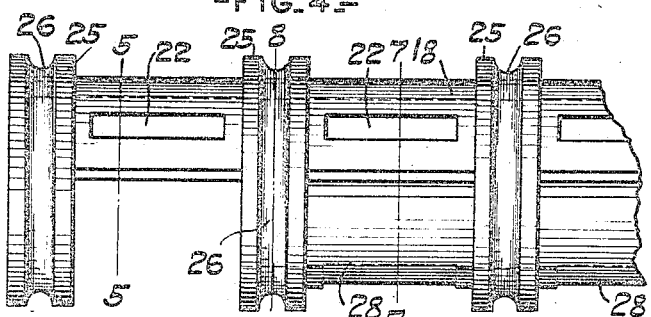
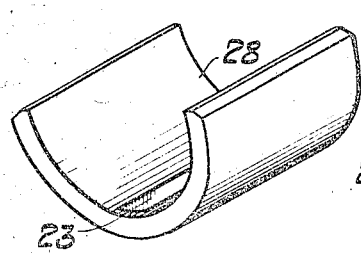
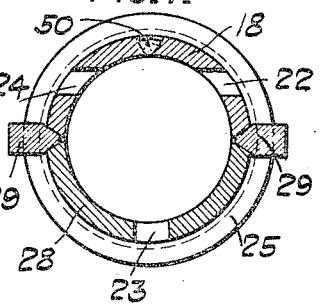
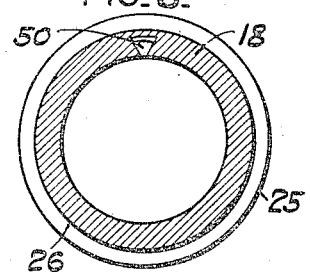
INVENTOR
Frank L. Morse.
by Edward H. Wright
Atty.

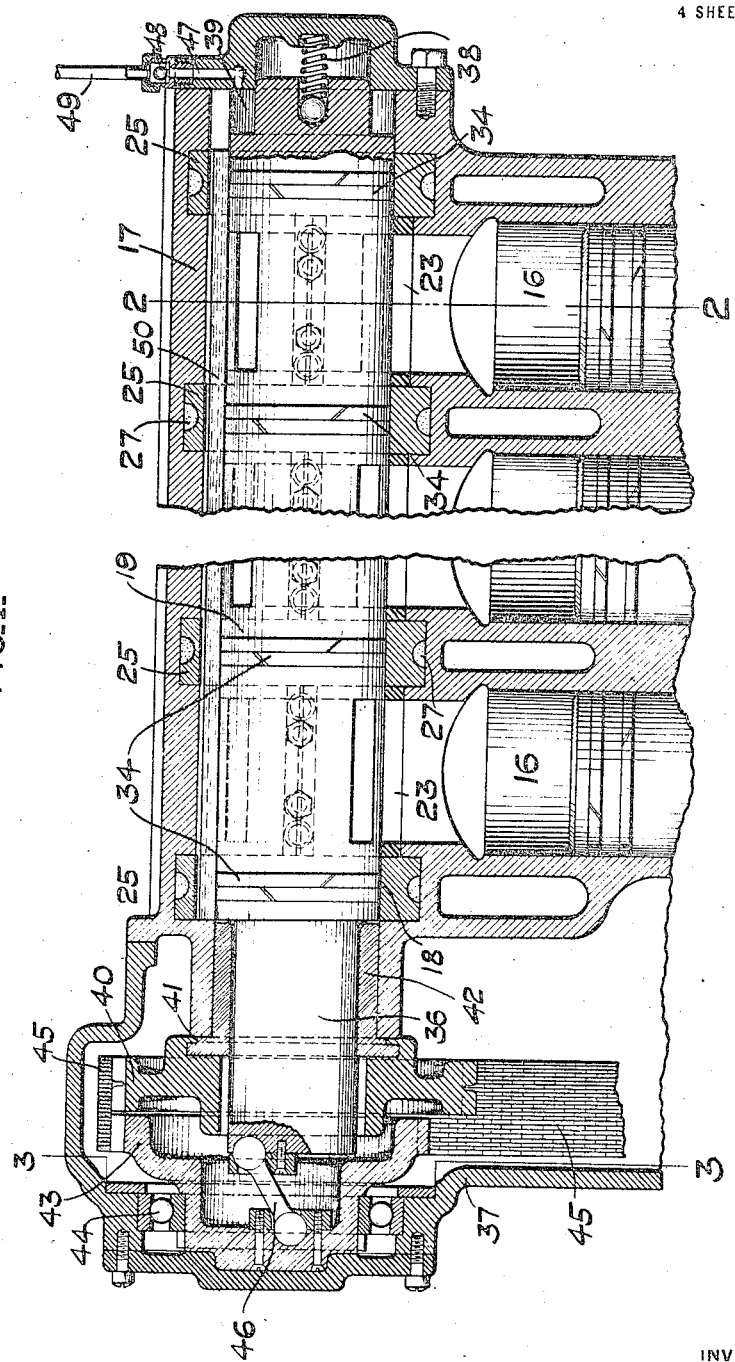

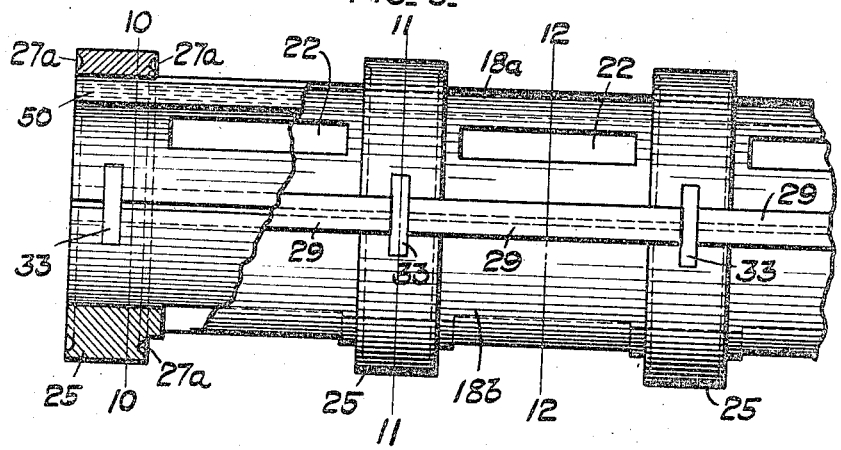
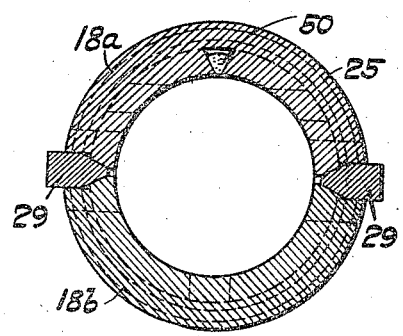
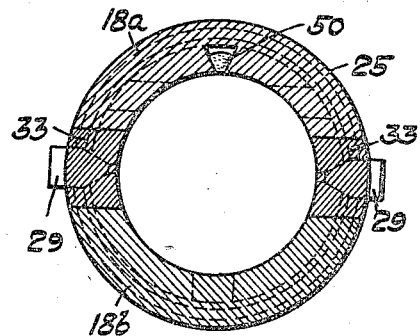
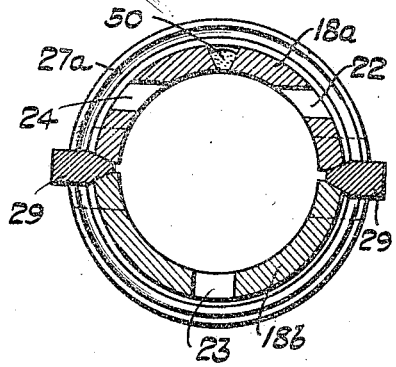
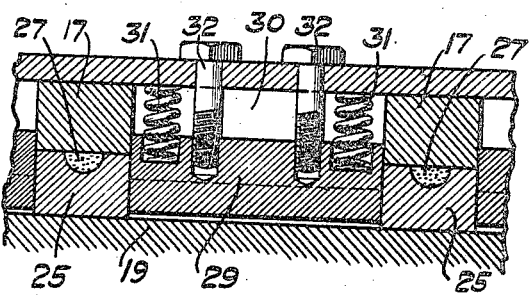

F. L. MORSE.
VALVE MECHANISM FOR GAS ENGINES.
APPLICATION FILED MAY 11, 1915.
1,210,672.
Patented Jan. 2, 1917.
4 SHEETS—SHEET 4.
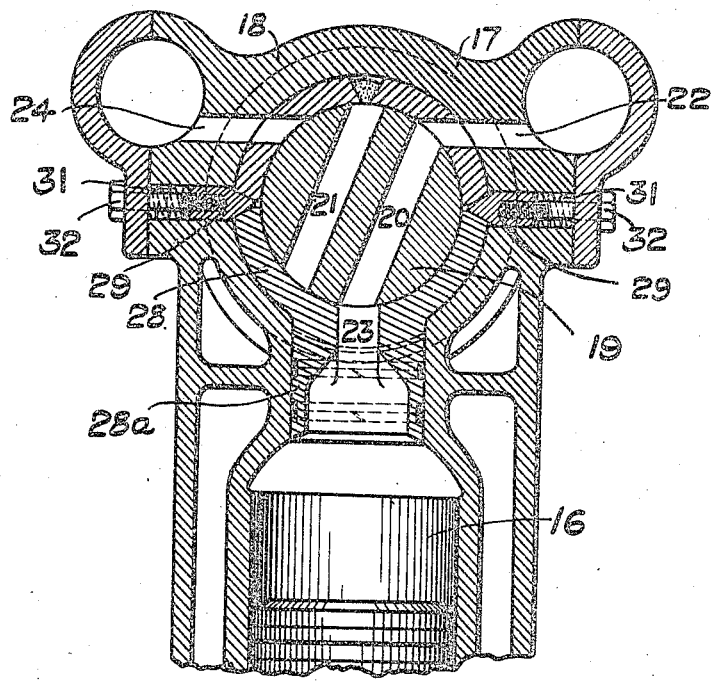
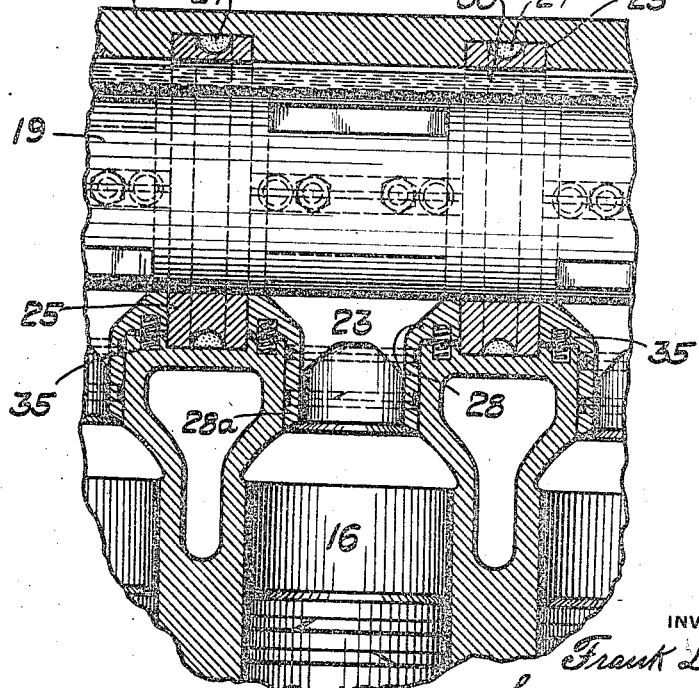
INVENTOR
Frank L. Morse
by Edward A. Wright
Atty.

UNITED STATES PATENT OFFICE.

FRANK L. MORSE, OF ITHACA, NEW YORK.

VALVE MECHANISM FOR GAS-ENGINES.

1,210,672.   Specification of Letters Patent.   Patented Jan. 2, 1917.

Application filed May 11, 1915.   Serial No. 27,309.

*To all whom it may concern:*

Be it known that I, FRANK L. MORSE, of Ithaca, in the county of Tompkins and State of New York, have invented a certain new and useful Improvement in Valve Mechanism for Gas-Engines, of which improvement the following is a specification.

This invention relates to engine valves of the rotary type, in which difficulty has been experienced in maintaining an accurate fit and preventing leakage as the valve wears.

One of the objects of my invention is to overcome this difficulty, and for this purpose I provide a sectional bushing for the bearing of the valve, one of the sections or parts being adjustable and subject to the cylinder pressure, and means for sealing the joints between the sections.

Another object is to provide an improved packing means for preventing leakage from one of the cylinders around the valve or bushing.

Another object is to provide improved mechanism for rotating and reciprocating the valve.

Another feature of my improvement comprises improved means for lubricating the valve continuously throughout its length; and another feature consists in utilizing the longitudinal or reciprocating movement of the valve as a pump for circulating the lubricating oil.

In the accompanying drawings: Figure 1 is a longitudinal vertical section of the upper portion of a multiple cylinder gas engine and valve mechanism embodying my improvement; Fig. 2, a transverse section taken on the line 2—2 of Fig. 1; Fig. 3, a transverse section taken on the line 3—3 of Fig. 1; Fig. 4, a side view of a portion of one form of improved sectional sleeve or valve bushing, one of the sections being removed; Fig. 5, a transverse section of said bushing, taken on the line 5—5 of Fig. 4;
Fig. 6, a perspective view of one of the bushing sections removed; Fig. 7, a transverse section of the valve bushing, taken on the line 7—7 of Fig. 4, and showing the sealing wedges in position; Fig. 8, a transverse section of the valve bushing, taken on the line 8—8 of Fig. 4; Fig. 9, a side view, partly in section, showing a modified form of valve bushing; Figs. 10, 11 and 12, transverse sections taken on the respective lines 10—10, 11—11, and 12—12 of Fig. 9; Fig. 13, a horizontal section taken through one of the sealing wedges at the side of the bushing, in the construction shown in Figs. 1 and 2; Fig. 14, a transverse section similar to Fig. 2, but showing a modified form of sectional bushing; and Fig. 15, a vertical longitudinal section of the modification shown in Fig. 14.

This improvement is applicable to one or more cylinders, but in the drawings, I have illustrated the same in connection with a multiple cylinder gas engine having cylinders, 16, valve casing, 17, containing bushing or sleeve, 18, and the cylindrical rotary valve, 19, extending across the top of the cylinders and having ports, 20 and 21, adapted to establish communication alternately from the gas supply port, 22, to the engine cylinder port, 23, and from the latter to the exhaust port, 24, for each cylinder in the usual operation of the engine.

According to one of the features of my improvement, the valve bushing is made in sectional form, preferably divided horizontally at about its middle point, and one of the parts being movable and adjustable relative to the other and to the valve.

As shown in Figs. 1 to 8 inclusive, the bushing, 18, is provided with projecting rings, 25, fitting within corresponding recesses formed in the valve casing, 17, and located on both sides of each cylinder, the rings being provided with circumferential grooves, 26, for containing packing rings, 27, to prevent leakage along the outside of the bushing. The lower portion of the hollow cylindrical bushing between each pair of projecting rings is formed as a separate adjustable section, 28, and the adjacent edges of the upper and lower sections are beveled to engage the inclined faces of the horizontal sealing wedges, 29, located in the chambers, 30, at opposite sides of the bushing, and between the projecting rings, 25, as shown more fully in Fig. 13. The wedges are pressed into engagement with the bushing sections by the springs, 31, and adjustable pins or bolts, 32, are provided for limiting the inward movement of the wedges under the action of the springs. The pressure within the engine cylinder acts upon the lower side of the lower bushing section, 28, pressing the same against the cylindrical valve and against the wedges, 29, thereby maintaining a close engaging fit between the valve and the bushing and compensating for wear between the parts. The space between the edges of the bushing sections allows for the taking up of the same as the wear takes place, and the faces of the wedges are inclined at such an angle that the pressure in the cylinder acting on the lower bushing section causes the same to force the wedges outward and bear tightly against the valve, while at the same time the springs, 30, act upon the wedges with sufficient force to keep the joint between the sections tightly closed and sealed against leakage of fluid pressure from the valve ports, as they pass this joint, to the outside of the bushing. The springs, 31, act to maintain the wedges in close contact with the edges of the sections of the bushing, but are adapted to yield under the force of the gas pressure in the engine cylinder, the bolts, 32, serving to prevent the wedges from moving too far inward when there is no pressure in the cylinder.

According to the modification shown in Figs. 9 to 12, the valve sleeve or bushing is divided throughout its length into upper and lower half sections, 18ª, and 18ᵇ, the sealing wedges, 29, in this construction extending also over a portion of the rings, 25, and having blocks, 33, located in slots in the sleeve sections at the ends of the wedges for preventing leakage at this point. The packing grooves, 27ª, may be formed in the side faces of the projecting ring portions. Otherwise the construction may be substantially the same as above described in connection with Figs. 1 and 2. Split metal packing rings, 34, are mounted on the cylindrical valve, 19, at its ends and between adjacent cylinders to prevent leakage between the valve and the bushing.

As shown in Figs. 14 and 15, the lower sections, 28, of the bushing are provided with cylindrical projections at the bottom, forming piston heads, 28ª, slidably mounted at the upper end of the engine cylinders, and subject to the pressure therein, the cylinder port, 23, extending through said piston head into the cylinder. This head, 28ª, is preferably of less diameter than the engine cylinder and may be made of any suitable size to give the desired amount of pressure to force the lower section of the bushing against the valve. For the purpose of holding the lower bushing section in contact with the valve when there is no pressure in the engine cylinder, suitable springs may be employed in all of the modifications, as indicated for instance, at 35, in Fig. 15.

Another feature of my improvement relates to the mechanism for operating the valve, which is of the type that produces both a rotary and a reciprocatory movement of the valve whereby different paths are described by the valve during its successive revolutions, as set forth in my prior application Serial Number 758,155, filed April 1, 1913.

According to my present improvement, a single drive chain is employed, operating over two sprocket wheels of different diameters, but having their perimeters co-incident at one point, for producing both the rotating and reciprocating movements of the valve. As shown in Figs. 1 and 3, the sprocket wheel, 40, is mounted with a spline connection on the end of the stem, 36, of the cylindrical valve, in order to cause rotation of the valve, but at the same time to permit a longitudinal reciprocating movement of the valve stem through the hub of the sprocket wheel, the latter being connected by a flange, 41, with the bushing, 42, rigidly mounted in the casing for preventing movement of said sprocket in a direction lengthwise of the valve. Another sprocket wheel, 43, of less diameter is mounted in a bearing, 44, supported in the frame, 37, opposite the end of the valve stem in such position that the perimeters of the two wheels coincide at one point and their respective teeth are therefore substantially in line at one portion, preferably the top portion, of the wheels. The drive chain, 45, is then passed over both wheels, being of sufficient width for this purpose, and engages the teeth thereof simultaneously at the upper or co-incident portion of the perimeters, the chain being driven by the usual driving sprocket on the engine shaft, (not shown). The end of the valve shaft or stem, 36, it attached to the hub of the wheel, 43, by means of a link, 46, having a universal joint at each end, the points of attachment being eccentric to the wheel and the valve shaft, whereby during the rotary movement of the sprockets and valve, the latter is also caused to reciprocate longitudinally in its bushing.

As the sprocket wheels are eccentric to each other and have a different number of teeth, it will be seen that, for each revolution of the wheel, 40, the wheel, 43, will be rotated slightly more than one revolution so that the relative position of the axes is being constantly shifted, and through the link connection, 46, the valve will be moved longitudinally a slight distance during each revolution. In this way each point of the valve describes a different path at each successive revolution, and the valve and bushing is subjected to a polishing action which prevents the formation of ridges and grooves, and insures a smooth and uniform wear.

According to another feature of my improvement, the reciprocating movement of the cylindrical valve is utilized as a pump for producing a circulation of oil to effectually lubricate the valve. As shown in Fig. 1, an oil chamber, 39, is formed in the casing at the end of the valve, and communicates by a port, 47, containing check valve, 48, with an oil supply pipe, 49, which may lead from an oil well or other source. The chamber, 39, also communicates with a longitudinal passage, 50, formed lengthwise in the valve bushing, 18, and provided with a series of holes or a continuous slot opening leading to the surface of the valve. A spring, 38, may be employed to act against the end of the valve and assist the outward movement. By means of this construction the reciprocating movement of the cylindrical valve serves as a pump to draw oil from supply pipe, 49, into chamber, 39, and force the same through passage, 50, to the outer surface of the valve, thereby providing a thorough and continuous lubrication of the valve throughout its full length at all times. The passage, 50, may be filled with lubricant waste or wicking to assist in the distribution of the oil on the face of the valve.

Having now described my invention, what I claim as new and desire to secure by Letters Patent is:

1. In a valve mechanism for engines, the combination with a cylindrical rotary valve, of a bushing inclosing said valve and formed in separate sections, and sealing pieces engaging the longitudinal edges of said sections, one of the sections being adjustable and subject to the cylinder pressure for forcing said section against the valve.

2. In a valve mechanism for engines, the combination of a cylindrical rotary valve, a sectional bushing therefor, one of the sections being adjustable, and means for sealing the joint between the sections.

3. In a valve mechanism for engines, the combination of a cylindrical rotary valve, of a bushing inclosing said valve and formed in separate sections, one of the sections being adjustable, and an adjustable wedge engaging the edges of said sections for closing the joint between the same.

4. In a valve mechanism for engines, the combination of a cylindrical rotary valve having ports, a sectional bushing for said valve having supply and exhaust ports and sealing pieces between said sections, one of said sections being adjustable and subject to the cylinder pressure, said adjustable section also having a port communicating with the engine cylinder.

5. In a valve mechanism for engines, the combination of a cylindrical rotary valve, of a bushing inclosing said valve and formed in separate sections, one of the sections being adjustable, and subject to the cylinder pressure for forcing same against the valve, and adjustable wedges engaging the edges of said sections for closing the joint between the same.

6. In a valve mechanism for engines, the combination of a cylindrical rotary valve, of a bushing inclosing said valve and formed in separate sections, one of the sections being adjustable, wedges engaging the edges of said sections for closing the joint between the same, springs for said wedges, and stops for limiting the inward movement of said wedges.

7. In a valve mechanism for engines, the combination of a cylindrical rotary valve, a sectional bushing therefor having projecting rings formed upon the outside of said bushing at both sides of the engine cylinder, and provided with packing for preventing leakage along the outside of the bushing.

8. In a valve mechanism for engines, the combination of a cylindrical rotary valve, a sectional bushing therefor having projecting rings formed upon the outside of said bushing at both sides of the engine cylinder, one of the sections extending between said rings and subject to the cylinder pressure for forcing same against the valve.

9. In a valve mechanism for engines, the combination of a cylindrical rotary valve, a sprocket wheel mounted to rotate with said valve, but so connected as to permit a longitudinal sliding movement of the valve relative to the wheel, another sprocket wheel mounted in close proximity to the first wheel but having a different number of teeth, the teeth of the two wheels being substantially in line at one portion of the perimeter, a single driving element engaging both wheels at said portion, and a link connecting said second wheel with the valve.

10. In a valve mechanism for engines, the combination of a cylindrical rotary valve, a sprocket wheel mounted to rotate with said valve, but so connected as to permit a longitudinal sliding movement of the valve relative to the wheel, another sprocket wheel of different diameter rotatably mounted on the frame in close proximity to the first wheel, the teeth of the two wheels being substantially in line at one portion of the perimeter, a single driving element engaging both wheels at said portion, and a link eccentrically connected to the hub of said second wheel and to the end of the valve.

11. In a valve mechanism for engines, the combination of a cylindrical rotary valve, a sprocket wheel mounted to rotate with said valve, but so connected as to permit a longitudinal sliding movement of the valve relative to the wheel, another sprocket wheel of smaller diameter and less number of teeth rotatably mounted on the frame in close proximity to the first wheel, the teeth of the two wheels being substantially in line at a portion of the perimeter, a single drive chain engaging both wheels at said portion, and a link eccentrically attached to said second wheel and to the valve.

12. In a valve mechanism for engines, the combination with a rotary valve having a combined rotary and reciprocating movement, of a pumping means operated by the reciprocating movement of said valve for circulating oil to lubricate the same.

13. In a valve mechanism for engines, the combination with a rotary valve having a combined rotary and reciprocating movement, a bushing having an oil passage for lubricating the valve, and pumping means operated by the reciprocating movement of the valve for supplying oil to said passage.

14. In a valve mechanism for engines, the combination with a rotary valve having a combined rotary and reciprocating movement, and a casing having a chamber at the end of the valve, provided with oil inlet and discharge passages, the discharge leading to the wearing surface of the valve.

15. In a valve mechanism for engines, the combination with a rotary valve having a combined rotary and reciprocating movement, a bushing having a longitudinal passage for lubricating said valve, and a chamber at the end of the valve provided with an oil inlet containing a check valve, and a discharge port communicating with said oil passage in the bushing.

16. In a valve mechanism for engines, the combination with a rotary valve having a combined rotary and reciprocating movement, a bushing having a longitudinal passage communicating with the wearing surface of the valve, wicking in said passage, and means operated by the reciprocating movement of the valve for supplying oil to said passage.

In testimony whereof I have hereunto set my hand.

FRANK L. MORSE.

Witnesses:
  D. B. PERRY,
  C. C. NICHOLS.